(12) United States Patent
Hayano et al.

(10) Patent No.: US 6,493,219 B2
(45) Date of Patent: *Dec. 10, 2002

(54) SEMICONDUCTOR MEMORY DEVICE (75) Inventors: Shiro Hayano, Kobe (JP); Kazuyoshi Nishiyama, Sanda (JP)

(73) Assignee: Contec Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,528

(22) Filed: Dec. 17, 1998

(65) Prior Publication Data

US 2002/0001173 A1 Jan. 3, 2002

Related U.S. Application Data (60) Provisional application No. 60/068,482, filed on Dec. 22, 1997.

(51) Int. Cl.[7] .............................. H05K 5/00; H05K 7/00; G06F 1/16
(52) U.S. Cl. ...................... 361/685; 439/928.1
(58) Field of Search .............................. 361/684, 685; 439/928.1

(56) References Cited

U.S. PATENT DOCUMENTS

| | | | | |
|---|---|---|---|---|
| 5,844,776 A | * | 12/1998 | Yamaguchi et al. | 361/684 |
| 5,943,208 A | * | 8/1999 | Kato et al. | 361/685 |
| 6,137,679 A | * | 10/2000 | Chang | 361/685 |

* cited by examiner

Primary Examiner—Jeffrey Donels
(74) Attorney, Agent, or Firm—Darby & Darby (57) ABSTRACT A single semiconductor memory device replaces a variety of hard disk device types having different mounting configurations. The semiconductor memory device must have available the same mounting configuration as that of the hard disk device. Including multiple mounting configuration means, such as screw holes, in the case of the semiconductor memory device avoids the need for multiple replacement semiconductor memory device types. The multiple mounting configurations allow the semiconductor memory device to be mounted in a variety of orientations and mounting configurations. Thus, a single semiconductor memory device type can replace multiple varieties of hard disk device types without the need for extra mounting equipment.

5 Claims, 7 Drawing Sheets

SEMICONDUCTOR MEMORY DEVICE

The present invention is a continuation in part of Provisional Application Ser. No. 60/068,482, filed Dec. 22, 1997.

BACKGROUND OF THE INVENTION

The present invention relates to a semiconductor memory device which can be exchanged with a variety of models of hard disk devices used with electronic equipment.

Figure 8:
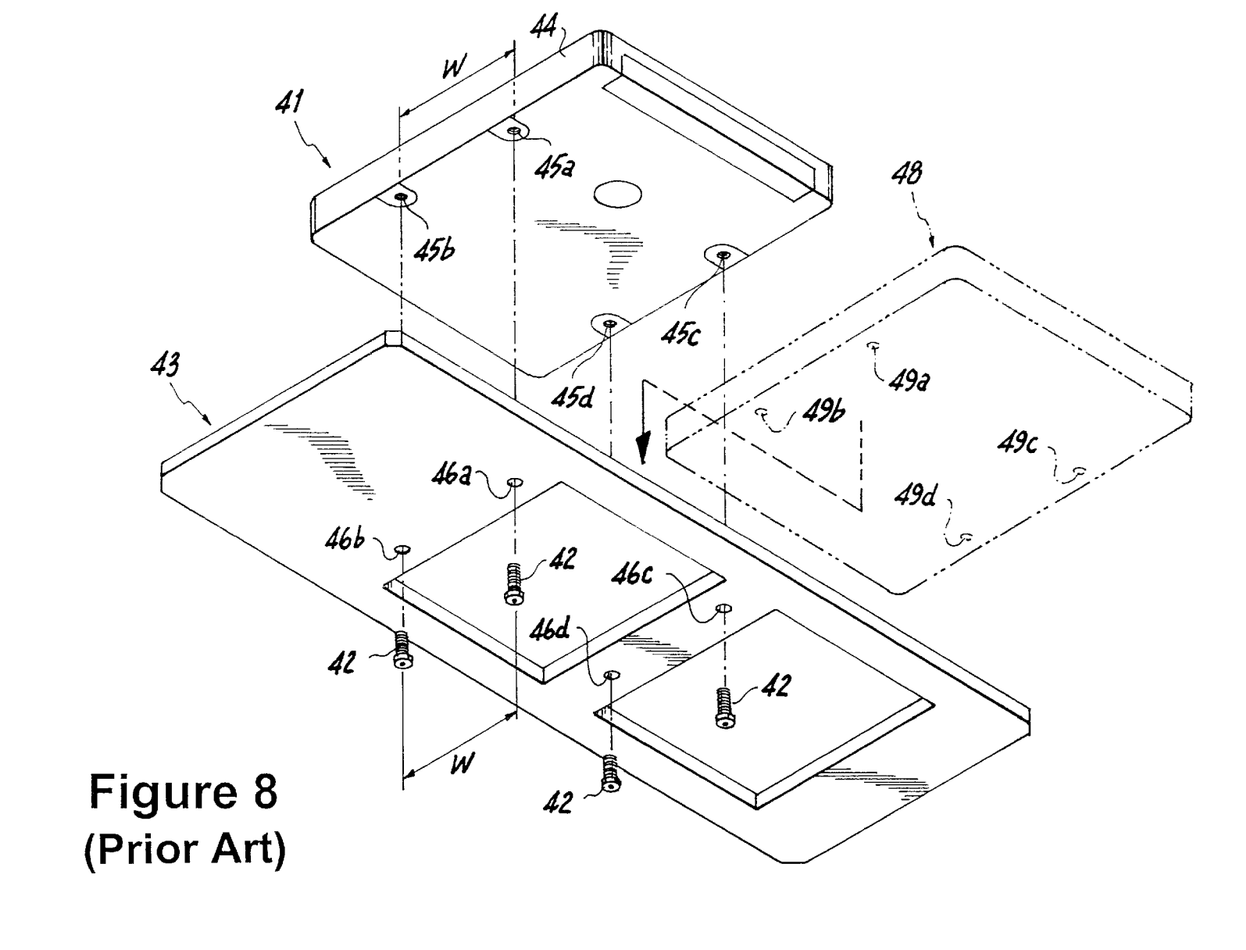
FIG. 8 is an exploded perspective view of a prior art mounting configuration indicating the attachment of a semiconductor memory device to a base in place of a hard disk device.

Personal computers and other devices requiring large capacity non-volatile storage have traditionally incorporated internal hard disks in their architecture. As shown in FIG. 8, a conventional hard disk device 41 is generally mounted to a base 43 inside a personal computer (not shown). A plurality of mounting screw holes 45a–45d are formed on a case 44 of hard disk device 41. Base 43 has a plurality of screw passage holes 46a–46d which align with each mounting screw hole 45a–45d. A plurality of screws 42 pass through the aligned screw holes to mount hard disk device 41 to base 43 inside the computer.

The prior art includes a disk (not shown) inside internal hard disk device 41. The disk spins at a high rotation rate. The disk is subject to vibration as a result of the high rate of rotation. These vibrations can damage the disk or cause impact between the disk surface and the read/write head(s) which access disk data.

In operating conditions where external vibrations or impacts are likely to occur such as, for example, in portable computers, the stress on the disk is exacerbated. In these types of environments, hard disk device 41 may be replaced with a semiconductor disk device 48 to reduce the number of moving parts which may be adversely affected by vibration or impact.

Semiconductor disk device 48 also serves as a replacement for hard disk device 41 for upgrade purposes. Hard disk device 41 can also be replaced by semiconductor disk device 48 during normal preventative maintenance program, or if hard disk device 41 fails.

Replacement of hard disk device 41 is accomplished by first removing screws 42 and hard disk device 41. Semiconductor disk device 48 is attached to base 43 with screws 42 which pass through corresponding mounting screw holes 49a–49d.

In the above described prior art the position and screw thread size and type of mounting screw holes 45a–45d change with different models of hard disk device 41. The position of screw passage holes 46a–46d and the spacing W also differs depending on the model of hard disk device 41. The spacing and hole pattern to mount semiconductor disk device 48 must correspond to each replaced model of hard disk device 41. A plurality of types of semiconductor disk devices 48 must therefore be prepared to match various spacing W, screw thread size and type and position for mounting screw holes 45a–45d corresponding to various models of hard disk device 41. If only one type of semiconductor disk device 48 is manufactured, replacement of hard disk device 41 is limited to one type. The position of mounting screw holes 49a–49d do not correspond to screw passage holes 46a–46d of base 43 when semiconductor disk device 48 is to be exchanged with hard disk device 41 of a differing model. Furthermore, when the screw thread size and type differ, semiconductor disk device 48 can not be mounted and attached to base 43 using screws 42.

OBJECTS AND SUMMARY OF THE INVENTION

An object of the present invention is to provide a technique for mounting a semiconductor memory device which overcomes the above discussed problems in the prior art.

Another object of the present invention is to provide the facility to exchange one type of semiconductor memory device with a plurality of models of hard disk devices.

Still another object of the present invention is to provide a semiconductor memory device as a non-volatile memory that can be easily mounted in a variety of electronic equipment.

It is still another object of the present invention to provide a semiconductor memory device which can be quickly and easily installed as a replacement for a hard disk device.

Yet another object of the present invention is to avoid the need of additional mounting equipment to adapt the semiconductor memory device to the mounting configuration of various hard disk device types.

Briefly stated, the present invention provides a single semiconductor memory device replaces a variety of hard disk device types having different mounting configurations. The semiconductor memory device must have available the same mounting configuration as that of the hard disk device. Including multiple mounting configuration means, such as screw holes, in the case of the semiconductor memory device avoids the need for multiple replacement semiconductor memory device types. The multiple mounting configurations allow the semiconductor memory device to be mounted in a variety of orientations and mounting configurations. Thus, a single semiconductor memory device type can replace multiple varieties of hard disk device types without the need for extra mounting equipment.

According to an embodiment of the present invention there is provided a semiconductor memory device comprising: a case, the case having at least first and second mounting means, the at least first mounting means includes a plurality of first mounting portions having a first inter-portion spacing in the case, the at least second mounting means includes a plurality of second mounting portions having a second inter-portion spacing in the case, an electronic device being capable of using a hard disk device for memory storage, the hard disk device being removably mounted to a plurality of third mounting portions of the electronic device, and at least one of the at least first and second mounting means aligned with the third mounting portions, whereby the semiconductor memory device is mounted to the electronic device in place of the hard disk device.

According to another embodiment of the present invention there is provided a semiconductor memory device comprising: a case, the case having at least first, second, third and fourth mounting means, both of the first and second mounting means being accessible from at least one of a front and a back of the semiconductor memory device, both of the third and forth mounting means being accessible from a left side and a right side of the semiconductor device, the at least first mounting means includes a plurality of first mounting portions having a first inter-portion spacing in the case, the at least second mounting means includes a plurality of second mounting portions having a second inter-portion spacing in the case, the at least third mounting means includes a plurality of third mounting portions having a third inter-portion spacing in the case, the at least fourth mounting means includes a plurality of fourth mounting portions having a fourth inter-portion spacing in the case, an electronic device being capable of using a hard disk device for memory storage, the hard disk device being removably mounted to a plurality of fifth mounting portions of the electronic device, and at least one of the at least first, second, third and fourth mounting means align with the plurality of fifth mounting portions, whereby the semiconductor memory device is mounted to the electronic device in place of the hard disk device.

According to another aspect of the present invention there is provided a method of replacing a variety of hard disk devices in different electronic devices with a single semiconductor memory device comprising: the electronic devices having a plurality of hard disk device mounting means including first attachment means that mount the hard disk device to the electronic equipment, removing the first attachment means, removing the hard disk device from the electronic device, the semiconductor memory device having at least two sets of pluralities of mounting means, orienting the semiconductor memory device such that at least one of the at least two sets aligns with corresponding hard disk device mounting means in the electronic device, and fixing the semiconductor memory device to the electronic device with at least one of the first attachment means and a second attachment means engaging the hard disk device mounting means and the at least one of the at least two sets, whereby the semiconductor memory device is mounted to the electronic equipment.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 7A:
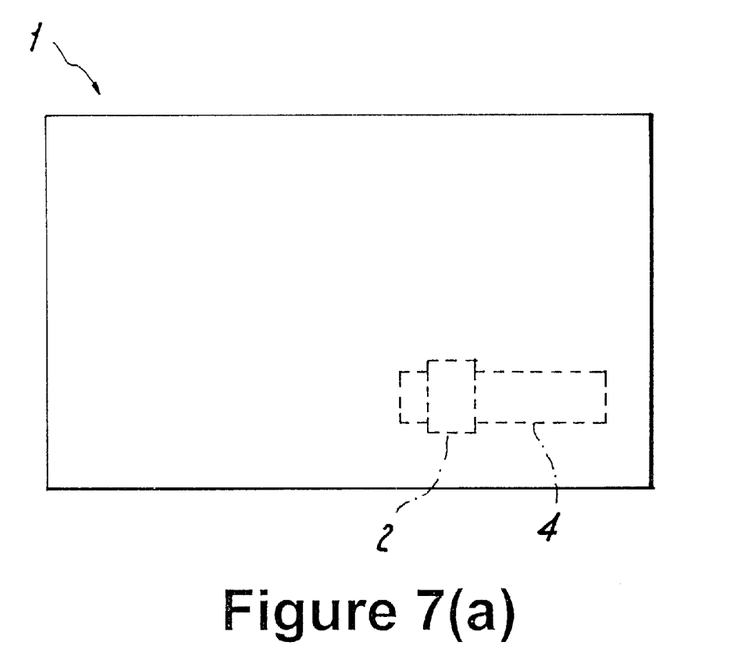
FIGS. 7(a)–7(b) are plan views of personal computers equipped with different type hard disk devices in different mounting configurations.

Referring first to FIG. 7(a), one type of an internal hard disk device 2 is shown that acts as a non-volatile memory storage device in a piece of electronic equipment, in this case a notebook type personal computer 1. Hard disk device 2 is oriented with its long dimension perpendicular to the long dimension of personal computer 1.

Figure 5:
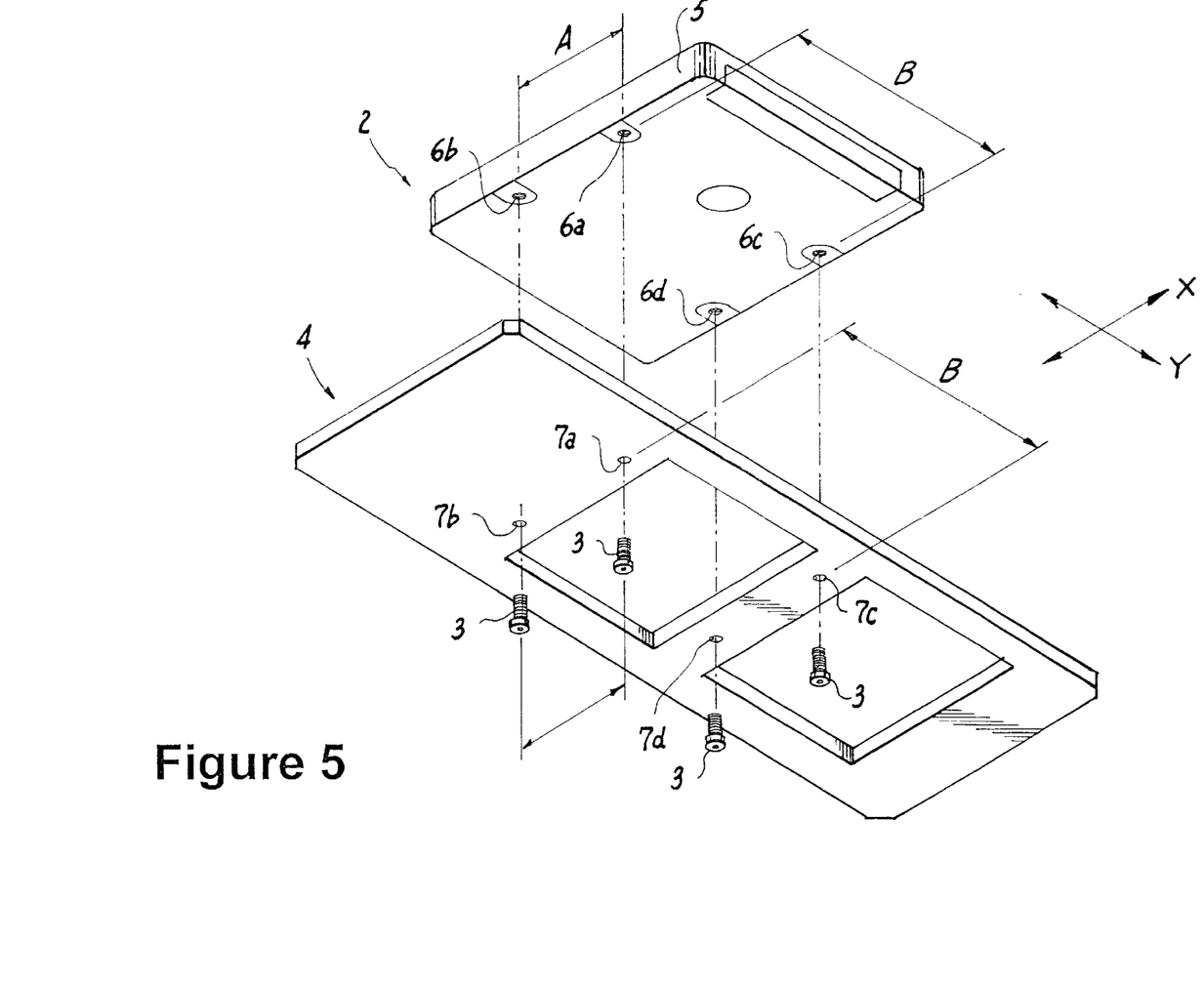
FIG. 5 is an exploded perspective view of a mounting configuration of a hard disk device to a base.

Referring to FIG. 5, hard disk device 2 is mounted and attached to a base 4 by a plurality of screws 3. Base 4 is placed in the interior of notebook type personal computer 1.

A plurality of mounting screw holes 6a–6d are formed in a case 5 of hard disk device 2. Screw passage holes 7a–7d are formed in base 4 and align with each mounting screw hole 6a–6d. Each of mounting screw holes 6a–6d and screw passage holes 7a–7d are formed so that there is a spacing A in the X-direction and a spacing B in the Y-direction.

Hard disk device 2 is placed in a mounting position on base 4. Each mounting screw hole 6a–6d is aligned with a corresponding screw passage hole 7a–7d. Hard disk device 2 is mounted to base 4 by inserting screws 3 into screw passage holes 7a–7d and screwing each screw 3 into mounting screw holes 6a–6d.

Figure 7B:
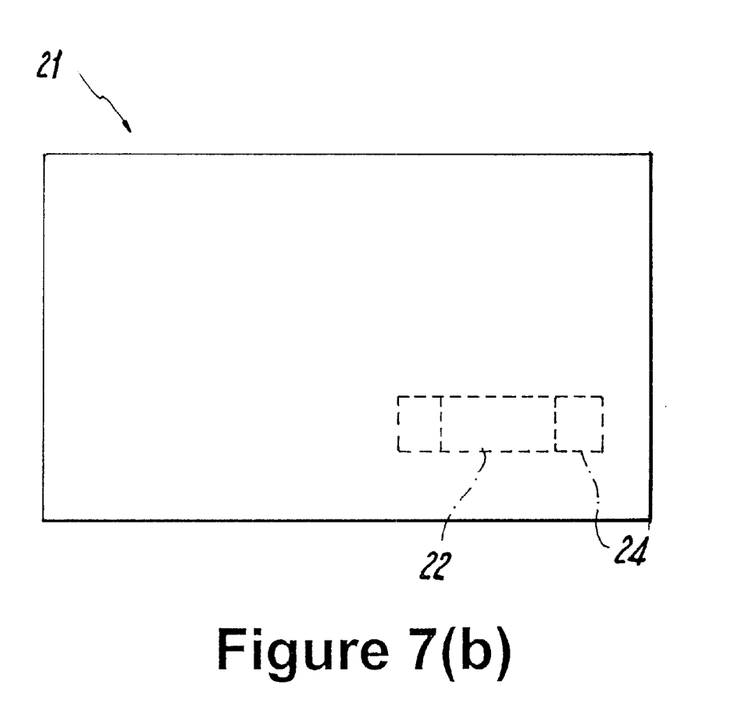

Referring to FIG. 7(b), another type of an internal hard disk device 22 is shown that acts as a non-volatile memory storage device in a piece of electronic equipment, in this case a notebook type personal computer 21. In contrast to the setup in FIG. 7(a), hard disk device 22 is oriented with its long dimension parallel to the long dimension of personal computer 21.

Figure 6:
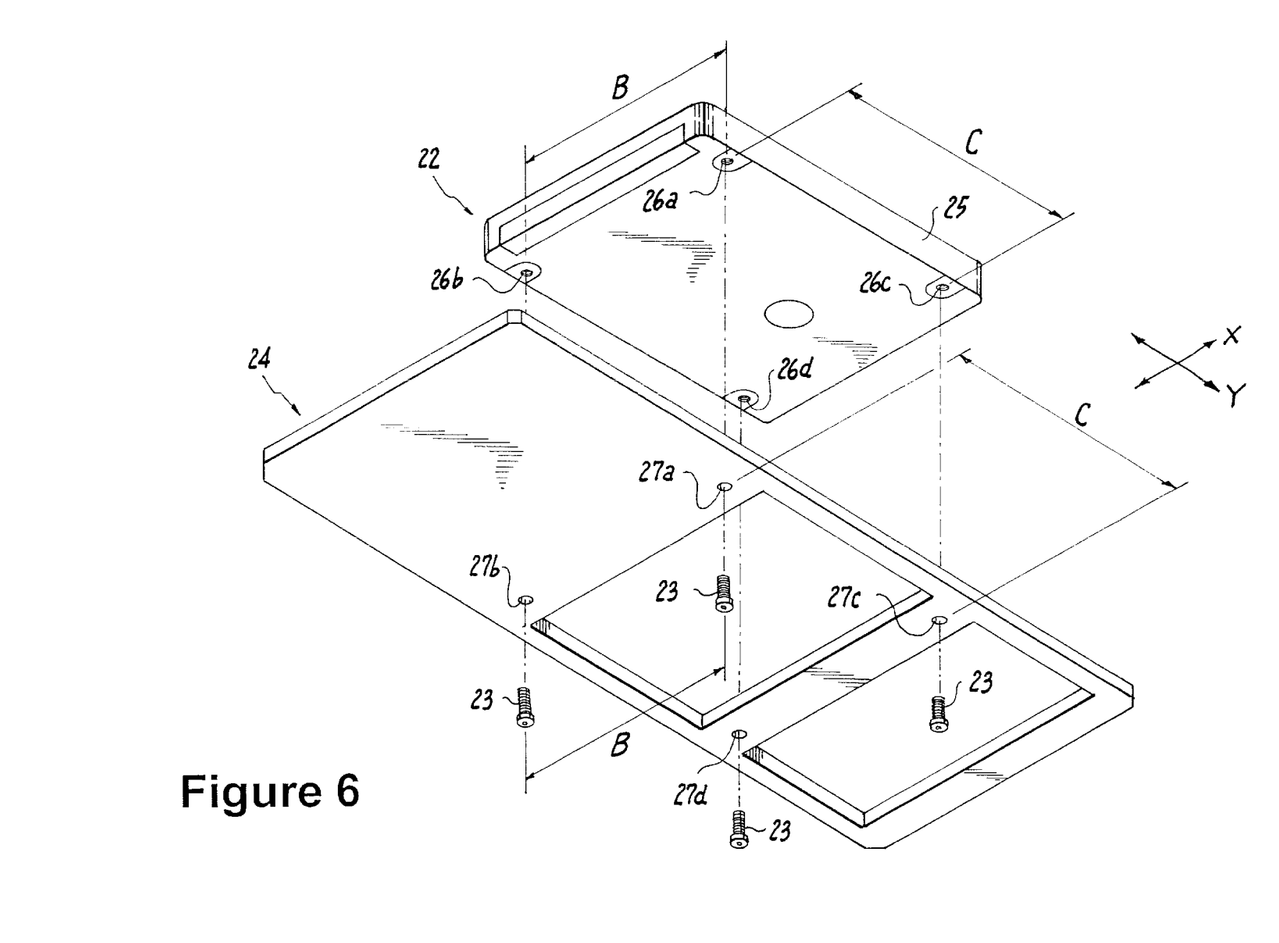
FIG. 6 is an exploded perspective view of another mounting configuration of a hard disk device to a base.

Referring to FIG. 6, hard disk device 22 is mounted and attached to a base 24 by a plurality of screws 23. Base 24 is placed in the interior of a notebook type personal computer 21.

A plurality of mounting screw holes 26a–26d are formed in a case 25 of hard disk device 22. Screw passage holes 27a–27d are formed on base 24 and align with each mounting screw hole 26a–26d. Each of mounting screw holes 26a–26d and screw passage holes 27a–27d are formed so that there is a spacing B in the X-direction and a spacing C in the Y-direction.

Hard disk device 22 is placed in a mounting position on base 24. Each mounting screw hole 26a–26d is aligned with a corresponding screw passage hole 27a–27d. Hard disk device 22 is mounted to base 24 by inserting screws 23 into screw passage holes 27a–27d and screwing each screw 23 into mounting screw holes 26a–26d.

In the configurations shown in FIGS. 5–7, screws 3 and screws 23 are of the same type, thread and size.

Referring to FIGS. 1–4, either of hard disk device 2 type or hard disk device 22 type can be replaced by a single semiconductor disk device 31. Semiconductor disk device 31 can be mounted in the same configuration to replace either hard disk device 2, with mounting dimensions A and B, or hard disk device 22, with mounting dimensions B and C. Although hard disk devices 2 and 22 share dimension B, dimensions A and C are different. This would obviate a common replacement by prior-art semiconductor disk devices.

Figure 1:
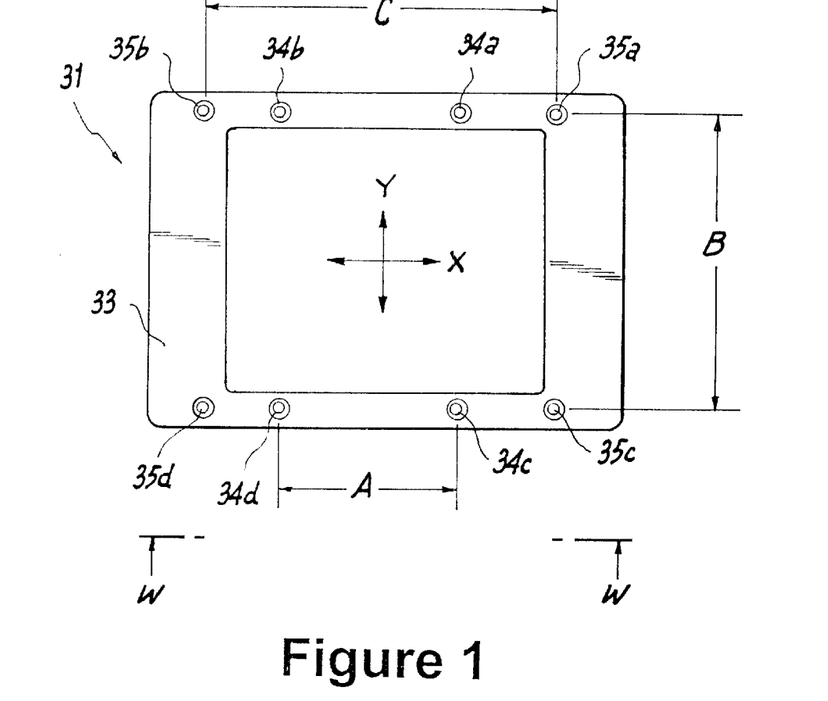
FIG. 1 is a bottom view of a semiconductor memory device according to an embodiment of the present invention.

Referring to FIG. 1, mounting screw holes 34a–34d comprise a portion of a first mounting means. Mounting screw holes 34a–34d are formed in a back side of case 33 of semiconductor disk device 31.

Figure 3:
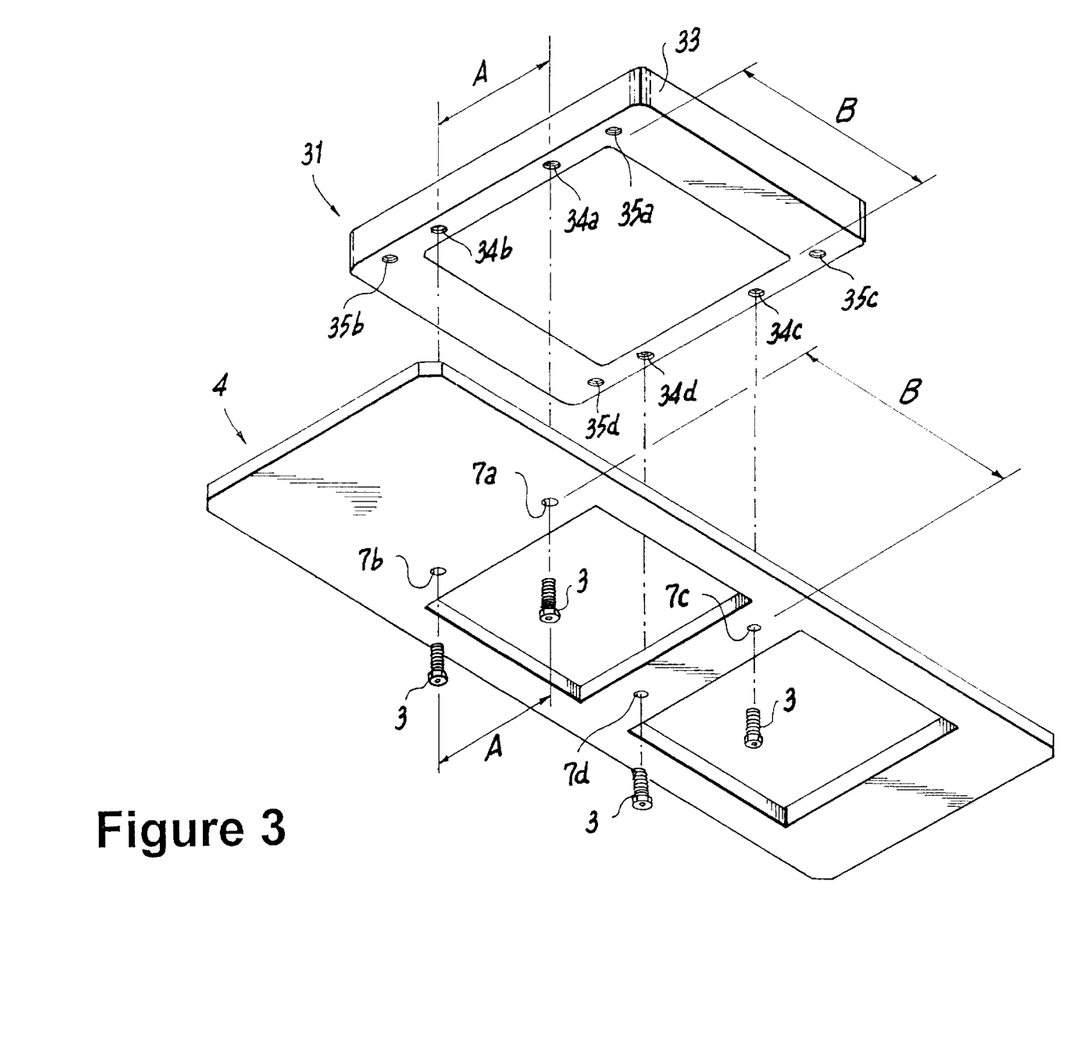
FIG. 3 is an exploded perspective view of a mounting configuration for the semiconductor memory device of FIG. 1 according to an embodiment of the resent invention.

Referring to FIG. 3, screw passage holes 7a–7d comprise a further portion of first mounting means. Screw passage holes 7a–7d are located in base 4 for alignment with mounting screw holes 34a–34d.

Referring again to FIG. 1, mounting screw holes 35a–35d comprise a portion of a second mounting means. Mounting screw holes 35a–35d are also formed in a back side of case 33 of semiconductor disk device 31.

Figure 4:
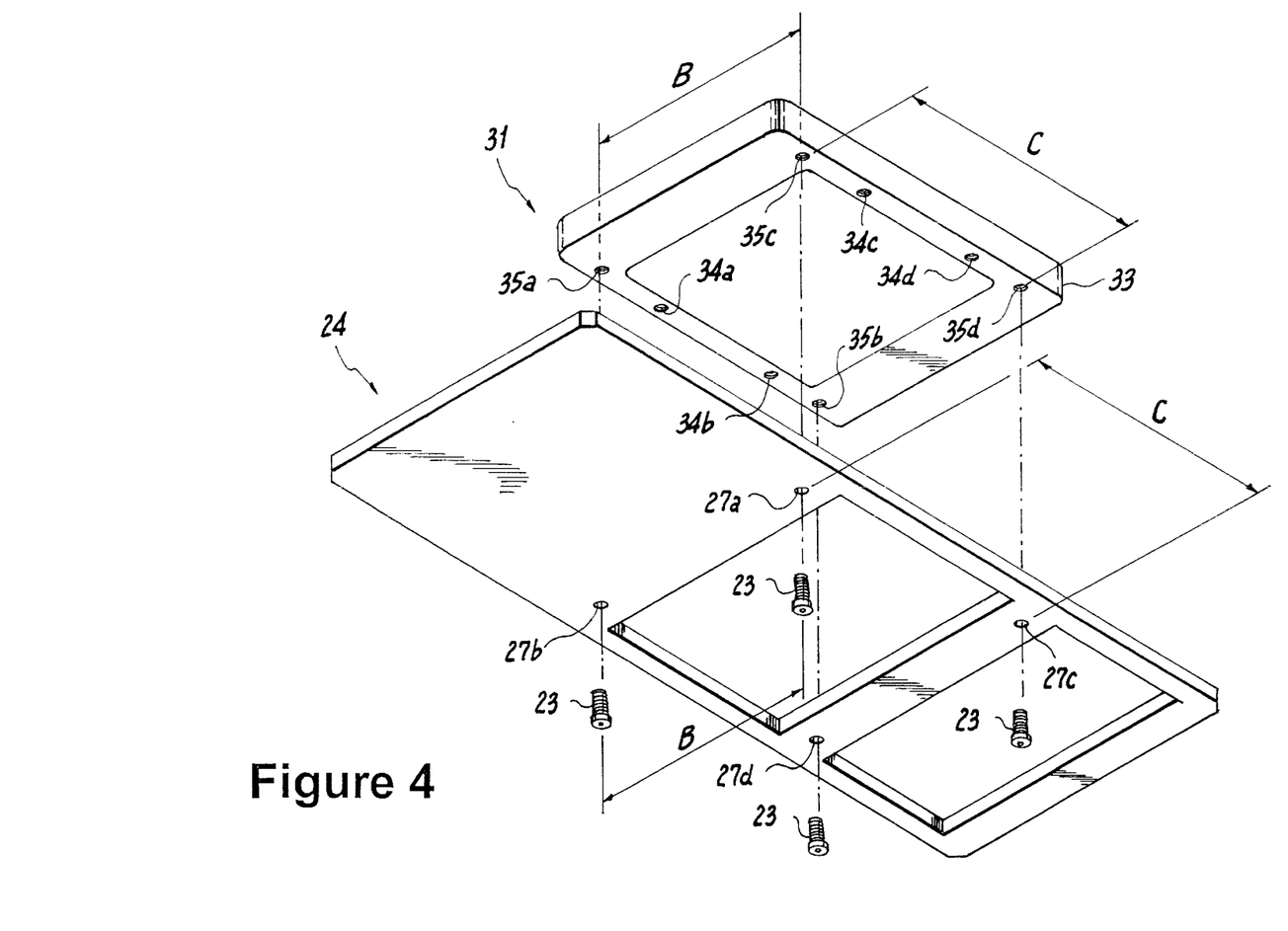
FIG. 4 is an exploded perspective view of another mounting configuration for the semiconductor device of FIG. 1 according to another embodiment of the present invention.

Referring to FIG. 4, screw passage holes 27a–27d comprise a further portion of second mounting means. Screw passage holes 27a–27d are located in base 24 and align with mounting screw holes 35a–35d.

Referring again to FIG. 1, mounting screw holes 34a–34d are formed with a spacing A in the X-direction and a spacing B in the Y-direction. Furthermore, mounting screw holes 35a–35d are formed with a spacing C in the X-direction and a spacing B in the Y-direction.

Figure 2:
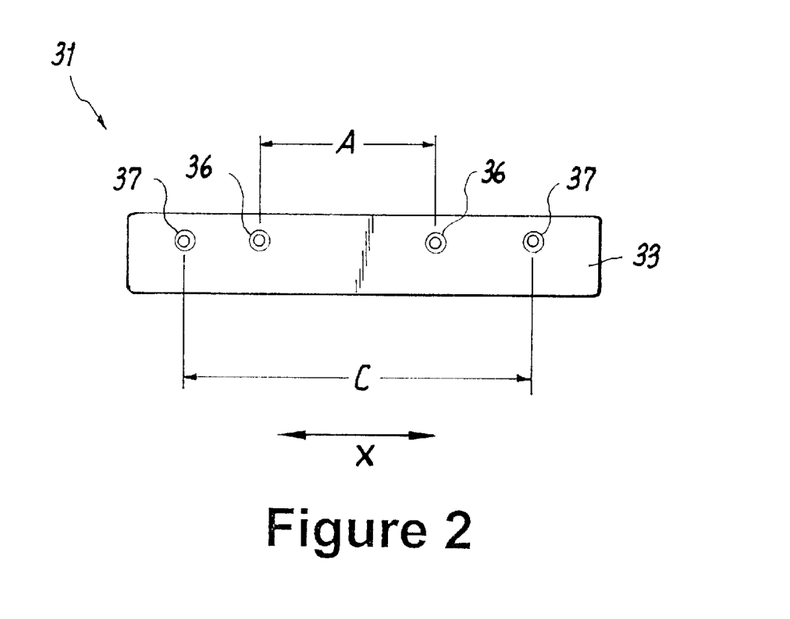
FIG. 2 is a side view of the semiconductor memory device of FIG. 1 viewed from along line W—W.

Referring to FIG. 2, mounting screw holes 36 and mounting screw holes 37 comprise portions of third and forth mounting means, respectively. Mounting screw holes 36, 37 are formed in both side surfaces of case 33. Mounting screw holes 36, 37 are formed with a spacing A and C in the X-direction, respectively.

The present invention operates as follows with reference first to FIG. 5. First, hard disk device 2 is removed from personal computer 1 for reasons that include device failure, preventative maintenance or device upgrade. Screws 3 are loosened and hard disk device 2 is removed from base 4.

Referring next to FIG. 3, semiconductor disk device 31 is placed in a mounting position on base 4 in place of hard disk device 2. Semiconductor disk device 31 is oriented with mounting screw holes 34a–34d aligned with screw passage holes 7a–7d of base 4. Screws 3 are inserted through screw passage holes 7a–7d and into mounting screw holes 34a–34d. Screws 3 are then tightened in mounting screw holes 34a–34d to secure semiconductor disk device 31 to base 4. Thus, semiconductor disk device 31 is mounted on base 4 in place of one type of internal hard disk device 2 in a notebook type personal computer 1.

Now referring to FIG. 6, hard disk device 22 is removed from personal computer 21 for reasons that include device failure, preventative maintenance or device upgrade. Screws 23 are loosened and hard disk device 22 is removed from base 24.

Referring next to FIG. 4, semiconductor disk device 31 is placed in a mounting position on base 24 in place of hard disk device 22. Semiconductor disk device 31 is oriented with mounting screw holes 35a–35d aligned with screw passage holes 27a–27d of base 24. Screws 23 are inserted through screw passage holes 27a–27d and into second screw holes 35a–35d. Screws 23 are then tightened in mounting holes 35a–35d to secure semiconductor disk device 31 to base 24. Thus, semiconductor disk device 31 is mounted on base 24 in place of a different type of internal hard disk device 22 in a notebook type personal computer 21.

As the above configurations show, a single semiconductor disk device 31 replaces either hard disk device 2 or hard disk device 22 types. Depending on the type which is to be replaced, either mounting screw holes 34a–34d or mounting screw holes 35a–35d can be used to mount semiconductor disk device 31. As a result, a single semiconductor disk device 31 can be exchanged with two different models of hard disk devices 2, 22.

Semiconductor disk device 31 is also mounted in other configurations using mounting screw holes 36 and mounting screw holes 37. Semiconductor disk device 31 replaces hard disk devices mounted using screw holes corresponding to mounting screw holes 36. Alternatively, semiconductor disk device 31 replaces hard disk devices mounted using screw holes corresponding to mounting screw holes 37. Thus, one type of semiconductor disk device 31 can be exchanged with multiple types of hard disk devices 2, 22.

In the above embodiments, screws 3 and screws 23 are used as one example of mounting means. However, the mounting means is not limited to only screws 3, 23. For example, rivets can be used to mount semiconductor disk device 31. Furthermore, screws 3 and screws 23 are not limited to the same size and type, and can be of different sizes.

In addition, the above embodiments use personal computer 1 and personal computer 21 as examples of electronic equipment. The present invention is not limited to these examples, however. Other types of electronic equipment that operate using a hard disk device 2, 22 can be the object of the present invention.

In addition to the three interhole spacings A, B and C, more than three interhole spacings are considered to fall within the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A semiconductor memory device comprising:
   a case;
   said case having at least first and second mounting means;
   said at least first mounting means includes a plurality of first mounting portions having a first inter-portion spacing in said case;
   said at least second mounting means includes a plurality of second mounting portions having a second inter-portion spacing in said case;
   at least one of said at least first and second mounting means being alienable with third mounting portions of an electronic device using a hard disk device for memory storage, whereby said semiconductor memory device is mountable to said electronic device in place of said hard disk device at said third mounting portions;
   said first mounting portions include a plurality of first mounting screw holes;
   said second mounting portions include a plurality of second mounting screw holes;
   said third mounting portions include a plurality of screw passage holes;
   said screw passage holes being alienable with at least one of said pluralities of first and second mounting screw holes; and
   screws inserted through said screw passage holes and tightened into aligned ones of said at least one of said pluralities of first and second mounting screw holes, being effective to mount said semiconductor memory device to said electronic device.

2. A semiconductor memory device according to claim 1, wherein:
   said pluralities of first and second mounting screw holes are of different sizes, respectively.

3. A semiconductor memory device comprising:
   a case;
   said case having at least first and second mounting means;
   said at least first mounting means includes a plurality of first mounting portions having a first inter-portion spacing in said case;
   said at least second mounting means includes a plurality of second mounting portions having a second inter-portion spacing in said case;
   at least one of said at least first and second mounting means being alienable with third mounting portions of an electronic device using a hard disk device for memory storage, whereby said semiconductor memory device is mountable to said electronic device in place of said hard disk device at said third mounting portions;
   said first mounting portions including a plurality of first mounting rivet holes;
   said second mounting portion includes a plurality of second mounting rivet holes;

said third mounting portions includes a plurality of rivet passage holes;

said rivet passage holes being alienable with at least one of said pluralities of first and second mounting rivet holes;

rivets inserted through said rivet passage holes into aligned ones of said at least one of said pluralities of first and second mounting rivet holes; and said rivets being crimped on both ends, being effective to mount said semiconductor memory device to said electronic device.

4. A method of replacing a variety of hard disk devices in different electronic devices with a single semiconductor memory device comprising said electronic devices having a plurality of hard disk device mounting means including first attachment means that mounts said hard disk device to said electronic equipment;

removing said first attachment means;

removing said hard disk device from said electronic device;

said semiconductor memory device having at least two sets of pluralities of mounting means;

orienting said semiconductor memory device such that at least one of said at least two sets aligns with corresponding hard disk device mounting means in said electronic device;

fixing said semiconductor memory device to said electronic device with at least one of said first attachment means and a second attachment means engaging said hard disk device mounting means and said at least one of said at least two sets, whereby said semiconductor memory device is mounted to said electronic equipment;

said first attachment means include screws;

said second attachment means include rivets;

said at least two sets include mounting rivet holes; and said hard disk device mounting means includes rivet and screw passage holes.

5. A method of replacing a variety of hard disk devices in different electronic devices with a single semiconductor memory device comprising:

said electronic devices having a plurality of hard disk device mounting means including first attachment means that mounts said hard disk device to said electronic equipment;

removing said first attachment means;

removing said hard disk device from said electronic device;

said semiconductor memory device having at least two sets of pluralities of mounting means;

orienting said semiconductor memory device such that at least one of said at least two sets aligns with corresponding hard disk device mounting means in said electronic device;

fixing said semiconductor memory device to said electronic device with at least one of said first attachment means and a second attachment means engaging said hard disk device mounting means and said at least one of said at least two sets, whereby said semiconductor memory device is mounted to said electronic equipment;

said first attachment means includes rivets;

said second attachment means includes screws;

said at least two sets include mounting screw holes; and said hard disk device mounting means include rivet and screw passage holes.

* * * * *